(12) United States Patent
Lan et al.

(10) Patent No.: US 7,212,342 B2
(45) Date of Patent: May 1, 2007

(54) STRUCTURE OF A COLOR FILTER

(75) Inventors: Wei-Chou Lan, Taichung (TW);
Shih-Kwei Chiou, Taipei (TW)

(73) Assignee: Prime View International Co., Ltd., Hsinchu (TW)

( * ) Notice: Subject to any disclaimer, the term of this patent is extended or adjusted under 35 U.S.C. 154(b) by 583 days.

(21) Appl. No.: 10/658,827

(22) Filed: Sep. 9, 2003

(65) Prior Publication Data

US 2004/0174475 A1 Sep. 9, 2004

(30) Foreign Application Priority Data

Mar. 5, 2003 (TW) .............................. 92104723 A (51) Int. Cl.
*G02F 1/1335* (2006.01)
*G02B 5/20* (2006.01)

(52) U.S. Cl. ........................... 359/585; 359/589; 430/7

(58) Field of Classification Search ................... None
See application file for complete search history.

(56) References Cited

U.S. PATENT DOCUMENTS 5,039,204 A * 8/1991 Choi .......................... 349/106
5,398,133 A * 3/1995 Tsai et al. ................... 359/589
5,502,595 A * 3/1996 Kuo et al. ................... 359/589

* cited by examiner

*Primary Examiner*—John A. McPherson
(74) *Attorney, Agent, or Firm*—Thomas, Kayden, Horstemeyer & Risley (57) ABSTRACT

An indium tin oxide layer is formed on a glass substrate, and then a silicon nitride layer, an amorphous silicon layer and an n-type silicon layer are sequentially formed on the indium tin oxide layer to serve as a color filter. Thicknesses and processing conditions of the above layers are adjustable for providing various color filters, such as black matrixes, reflective red color filters, reflective green color filters, and reflective blue color filters.

8 Claims, 6 Drawing Sheets

STRUCTURE OF A COLOR FILTER

BACKGROUND OF THE INVENTION

1. Field of Invention

The present invention relates to an apparatus for a liquid crystal display. More particularly, the present invention relates to a structure of a color filter.

2. Description of Related Art

Liquid crystal is a material having properties between those of crystal and liquid. The alignment of the liquid crystal molecules varies in response to external stimulation such as an electrical field generated by an applied voltage. Hence, this feature of the liquid crystal molecules can be utilized to create a display unit.

A color thin film transistor liquid crystal display (TFT-LCD) is produced in current technology by separately fabricating a thin-film-transistor (TFT) array substrate and a color filter substrate and then assembling them together. The color filter substrate includes three color filters of red, green and blue, and black matrixes. The black matrixes shield the thin film transistors, wirings on the indium tin oxide (ITO), and some portions of the display area adjacent to electrodes. The portions adjacent to electrodes generally experience light leak problems because of non-uniform electric field distributions or in-plane electric fields. In addition, the main functions of the black matrixes are to increase contrast of display and to prevent light from damaging the thin film transistors, so the black matrixes must have optical characteristics of low reflectivity and high optical density.

Figure 1:
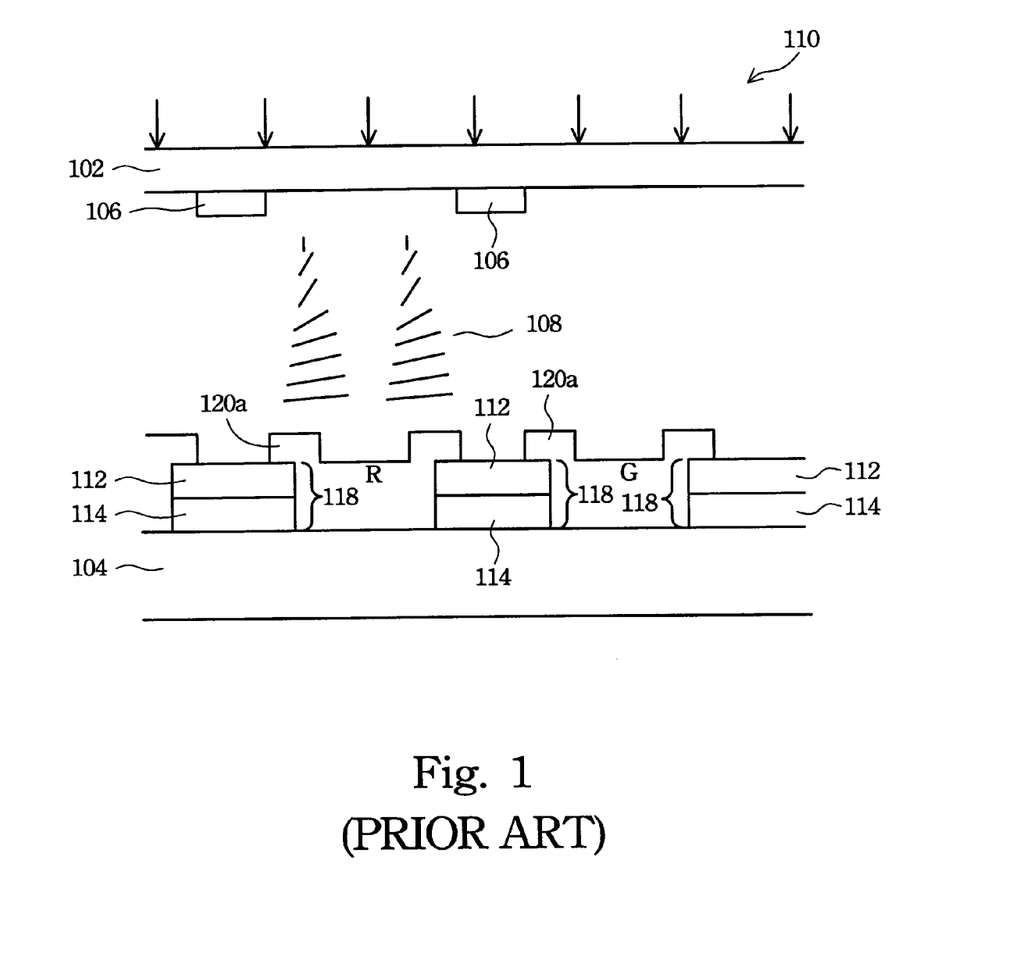
FIG. 1 is a schematic view of a conventional liquid crystal display panel structure.

FIG. 1 is a schematic view of a conventional liquid crystal display panel structure. A thin film transistor 106 is located on a thin film transistor substrate 102, and the thin film transistor 106 is in charge of changing voltage to control an alignment direction of liquid crystals 108. Black matrixes 118 are under the thin film transistor 106, and the black matrixes 118 are usually formed by a metal 112 and an oxide 114. Today, chromium and chromium oxide are usually used to form the black matrixes 108. Color filters 120*a* are located between the black matrixes 118, and filter light from a light source 110 into red, green and blue light in different regions. Moreover, the foregoing black matrixes 118 and the color filters 120*a* are all located on the substrate 104.

Generally, the conventional black matrixes of the metal/oxide structure experience problems of excessive reflection of external light and insufficient light shading. The thin film transistor is very sensitive to light, and easily generates a light current by a little light that affects its operation; moreover, more light may damage the thin film transistor. Insufficient light shading does not provide a good light shading for the thin film transistor, and makes a base color of the display panel appear only as dark blue, not black, which is able to improve contrast in vision. The excessive reflection of external light lowers the visibility of the liquid crystal display, and causes inconvenience in using it.

SUMMARY OF THE INVENTION

It is therefore an objective of the present invention to provide a structure of a color filter that satisfies the need to rectify the problems of the conventional black matrix, namely, poor light-shading and excessive reflection.

It is another an objective of the present invention to provide a structure of a reflective color filter which has good qualities and simple structures.

In accordance with the foregoing and other objectives of the present invention, a structure of a color filter is described. The color filter is formed of a substrate, an indium tin oxide layer, a silicon nitride layer, an amorphous silicon layer and an n-type silicon layer.

In one preferred embodiment of the present invention, the thicknesses of the indium tin oxide layer, the silicon nitride layer, the amorphous silicon layer, the n-type silicon layer, and the metal layer of a black matrix are about 420 Å, 500 Å, 500 Å, 500 Å, and 780 Å, respectively. A radio frequency power of the chemical vapor deposition process for growing the silicon nitride layer is 1.6 kilowatts (KW), and a material of the metal layer is chromium.

The thicknesses of the indium tin oxide layer, the silicon nitride layer, the amorphous silicon layer, the n-type silicon layer, and the metal layer of a reflective blue color filter are about 420 Å, 500 Å, 500 Å, 500 Å, and 780 Å, respectively. The radio frequency power of the chemical vapor deposition process for growing the silicon nitride layer is 2.1 KW, and the material of the metal layer is chromium.

The thicknesses of the indium tin oxide layer, the silicon nitride layer, the amorphous silicon layer, the n-type silicon layer, and the metal layer of a reflective green color filter are about 168 Å, 300 Å, 500 Å, 500 Å, and 780 Å, respectively. The radio frequency power of the chemical vapor deposition process for growing the silicon nitride layer is 1.6 KW, and the material of the metal layer is chromium.

The thicknesses of the indium tin oxide layer, the silicon nitride layer, the amorphous silicon layer, the n-type silicon layer, and the metal layer of a reflective red color filter are about 420 Å, 400 Å, 400 Å, 400 Å, and 780 Å, respectively. The radio frequency power of the chemical vapor deposition process for growing the silicon nitride layer is 2.1 KW, and the material of the metal layer is chromium.

The thicknesses of the indium tin oxide layer, the silicon nitride layer, the amorphous silicon layer, the n-type silicon layer, and the metal layer of another reflective red color filter are about 168 Å, 400 Å, 400 Å, 400 Å, and 780 Å, respectively. The radio frequency power of the chemical vapor deposition process for growing the silicon nitride layer is 1.6 KW, and the material of the metal layer is chromium.

In accordance with another of the present invention, a structure of a high-brightness reflective color filter is described. The color filter is formed of a substrate, a silicon nitride layer, an amorphous silicon layer and an n-type silicon layer.

In one preferred embodiment of the present invention, the thicknesses of the silicon nitride layer, the amorphous silicon layer, the n-type silicon layer, and the metal layer of a high-brightness red color filter are about 500 Å, 400 Å, 400 Å, and 780 Å, respectively. The radio frequency power of the chemical vapor deposition process for growing the silicon nitride layer is 1.6 KW, and the material of the metal layer is chromium.

The thicknesses of the silicon nitride layer, the amorphous silicon layer, the n-type silicon layer, and the metal layer of the black matrix are about 500 Å, 500 Å, 500 Å, and 780 Å, respectively. The radio frequency power of the chemical vapor deposition process for growing the silicon nitride layer is 1.6 KW, and the material of the metal layer is chromium.

The structure of black matrix of the invention provides good light-shading and low reflectivity. The reflectivity thereof is less than 5% in the long wavelength region (between 650 nm and 790 nm), thus rectifying the problems of the conventional black matrix, which is highly reflective in the long wavelength region and has a poor reflectivity.

The silicon nitride layer, amorphous silicon layer and n-type silicon layer of the invention all are grown by chemical vapor deposition processes, but the conventional black matrix made of metal/oxide is formed by physical vapor deposition processes. If light interference is to be generated in films, uniformities and thicknesses of the films are very critical. Chemical vapor deposition is better than physical vapor deposition for controlling the uniformities and thicknesses of films when forming films on patterned surfaces. The invention therefore provides a better film quality and light interference effect than the conventional techniques.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The invention first forms an indium tin oxide layer on a glass substrate, and then a silicon nitride layer, an amorphous silicon layer and an n-type silicon layer are sequentially formed on the indium tin oxide layer. When external light is emitted into the color filter of the invention from the glass substrate, the amorphous silicon layer and the n-type silicon layer first absorb the light, and then the metal layer shields and reflects the light. The incident light and the reflected light generate destructive interferes in the indium tin oxide layer and the silicon nitride layer. Further, because the incident light is reflected by the metal layer, the amorphous silicon layer and the n-type silicon layer absorb the light again.

Figure 2:
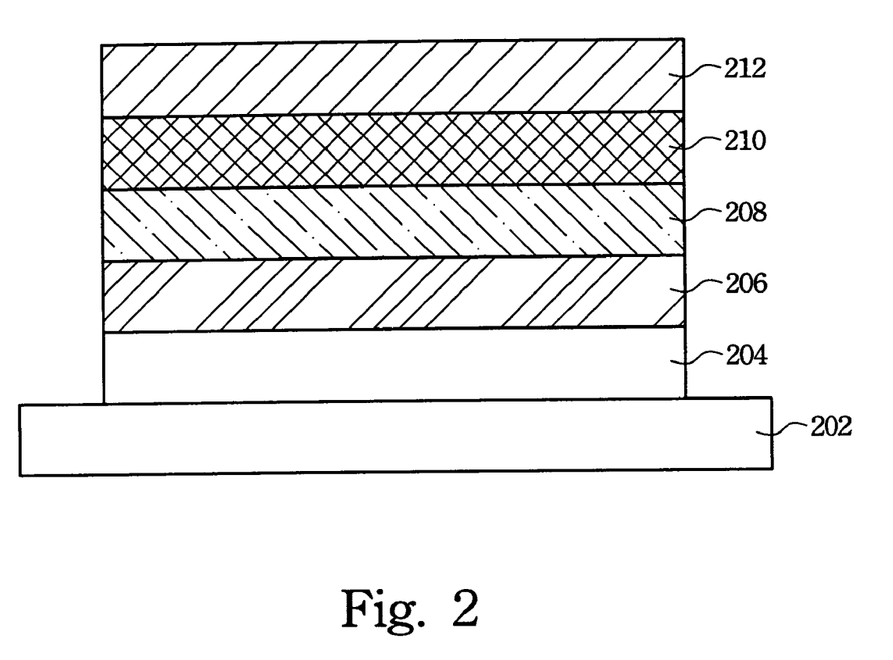
FIG. 2 is a cross-sectional view according to one preferred embodiment of this invention.

FIG. 2 is a cross-sectional view of one preferred embodiment of the invention. An indium tin oxide layer 204 is first grown on a glass substrate 202 by a physical vapor deposition (PVD) process. Then chemical vapor deposition processes are conducted to sequentially grow a silicon nitride layer 206, an amorphous silicon layer 208 and an n-type silicon layer 210. Finally, a metal layer 212 is formed by a physical vapor deposition process, thus completing the structure of a color filter.

According to a preferred embodiment of a black matrix of the invention, thicknesses of the indium tin oxide layer 204, the silicon nitride layer 206, the amorphous silicon layer 208, the n-type silicon layer 210 and the metal layer 212 are about 420 Å, 500 Å, 500 Å, 500 Å, and 780 Å, respectively. A radio frequency power of the chemical vapor deposition process for growing the silicon nitride layer 206 is 1.6 kilowatts (KW), a material of the metal layer 212 is chromium (Cr), and phosphorous (P) is doped into the n-type silicon layer 210, thus completing the structure of a black matrix with good light-shading and low reflectivity.

Figure 3:
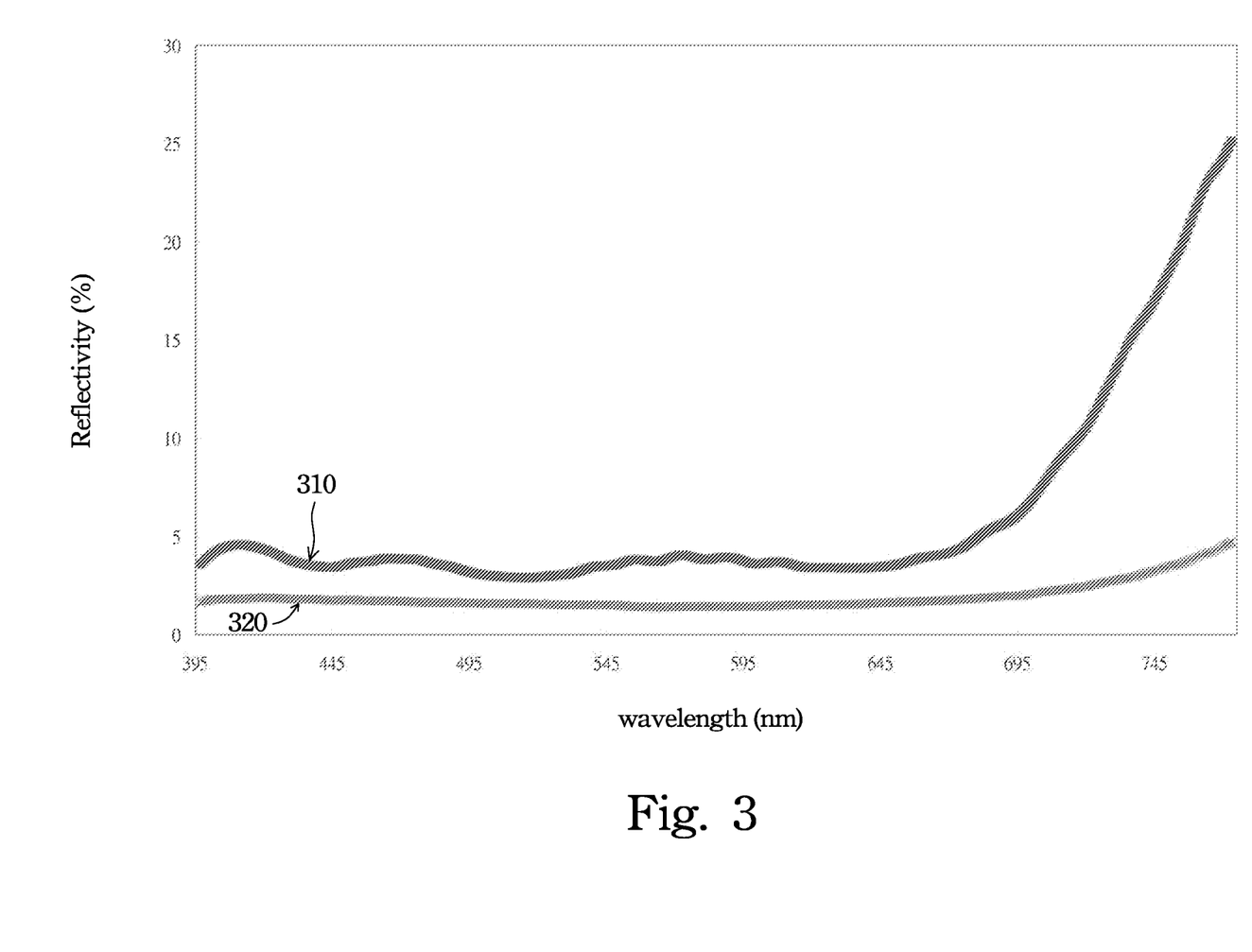
FIG. 3 is a spectrum of the reflectivity according to one preferred embodiment of the invention.

FIG. 3 is a spectrum of the reflectivity of one preferred embodiment of the invention, and a measured wavelength range is from about 390 nm to 780 nm. A spectral line 310 represents a reflectivity of the conventional black matrix made of chromium/chromium oxide, and another spectral line 320 represents a reflectivity of the black matrix of the invention. As illustrated in FIG. 3, the reflectivity of the black matrix of the invention is about 2% between about 390 nm and 650 nm, which is lower than the reflectivity of the conventional black matrix, about 4%. Between 650 nm and 790 nm, a red and infrared light region, the reflectivity of the conventional black matrix rises to about 25% following the wavelength, but the reflectivity of the black matrix of the invention is still less than about 5%. The black matrix of the invention can thus maintain a low reflectivity in the long wavelength region, and reduce the generation of the light reflection.

In addition to the black matrix, the invention also provides other color filters of different colors and different brightnesses by adjusting the thicknesses of the foregoing layers, and the process conditions thereof, such as changing the radio frequency power of the chemical vapor deposition process for growing the silicon nitride layer 206. The following description explains the reflective color filters of the invention, and provides several embodiments of with different colors and different brightnesses.

Thinknesses and process conditions of the embodiments of the reflective red, green and blue color filters are listed in Table 1. Table 1 gives two sets of thicknesses and process conditions for red color filters, and indicates that the invention can obtain color filters of the same color with different sets of thicknesses and process conditions. The thicknesses of the foregoing indium tin oxide layer 204, silicon nitride 206, amorphous silicon layer 208, n-type silicon layer 210 and metal layer 212, and the radio frequency power of the chemical vapor deposition process for growing the silicon nitride layer 206 are all listed in Table 1. Moreover, the material of the metal layer 212 in Table 1 is chromium, and phosphorous is doped into the n-type silicon layer 210 therein.

TABLE 1

Process parameters of reflective color filters of different colors.

| Thickness | Red | Red | Green | Blue |
| --- | --- | --- | --- | --- |
| Indium tin oxide layer 204 (Å) | 168 | 420 | 168 | 420 |
| Silicon nitride layer 206 (Å) | 400 | 400 | 300 | 500 |
| Amorphous silicon layer 208 (Å) | 400 | 400 | 500 | 500 |
| N-type silicon layer 210 (Å) | 400 | 400 | 500 | 500 |
| Metal layer 212 (Å) | 780 | 780 | 780 | 780 |
| RF power for growing silicon nitride layer 206 (KW) | 1.6 | 2.1 | 1.6 | 2.1 |

Figure 4:
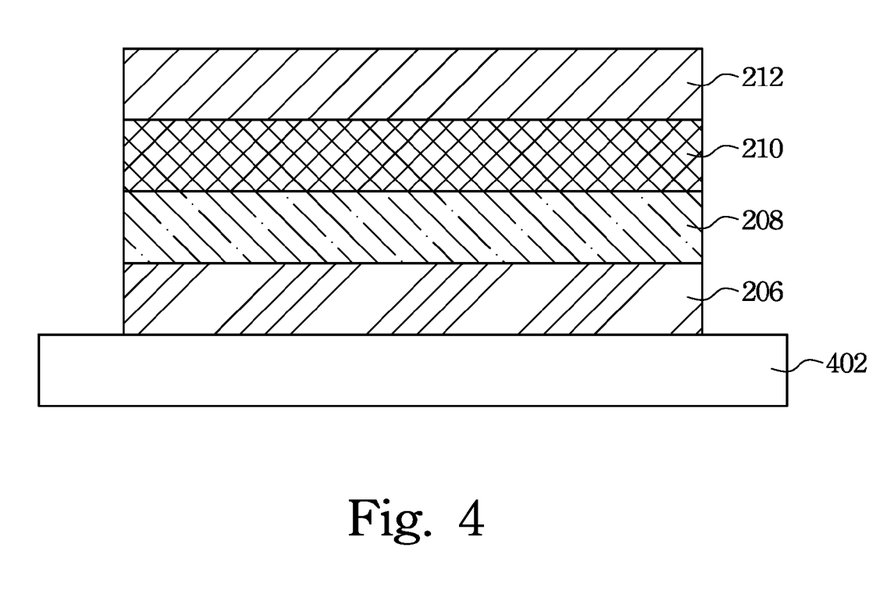
FIG. 4 is cross-sectional view according to another preferred embodiment of this invention.

According to another embodiment of the invention, the foregoing structure of the reflective color filter is altered, and the indium tin oxide layer 214 is not grown to obtain high-brightness reflective color filters. As illustrated in FIG. 4, a structure in FIG. 4 lacks the indium tin oxide layer 204, while the rest are the same as in FIG. 2. Table 2 lists process parameters of high-brightness reflective red and green color filters, including thicknesses of the silicon nitride layer 206, amorphous silicon layer 208, n-type silicon layer 210 and metal layer 212 and the radio frequency power of the chemical vapor deposition process for growing the silicon nitride layer 206. Moreover, the material of the metal layer 212 in Table 1 is chromium, and phosphorous is doped into the n-type silicon layer 210 therein.

TABLE 2

Process parameters of high-brightness reflective red and green color filters.

| Thickness | Red | Green |
| --- | --- | --- |
| Silicon nitride layer 206 (Å) | 500 | 500 |
| Amorphous silicon layer 208 (Å) | 400 | 500 |
| N-type silicon layer 210 (Å) | 400 | 500 |
| Metal layer 212 (Å) | 780 | 780 |
| RF power for growing silicon nitride layer 206 (KW) | 1.6 | 1.6 |

The invention also is able to grow the foregoing layers inversely. The metal layer first is formed on the substrate, and the n-type silicon layer, amorphous silicon layer, silicon nitride layer, and indium tin oxide layer are sequentially grown on the metal layer. When external light is emitted into the color filter of the invention from the indium tin oxide layer, the amorphous silicon layer and the n-type silicon layer first absorb some of the light excluding specific wavelengths, and then the metal layer reflects the light.

In the indium tin oxide layer and the silicon nitride layer, the incident light and the reflected light generate destructive interference on some wavelengths, excluding the specific wavelengths. Further, because the incident light is reflected by the metal layer, the amorphous silicon layer and the n-type silicon layer absorb the light again, but do not absorb the light of specific wavelengths. Thus the color filter of the invention filters the unnecessary light, and only reflects the light of specific wavelengths. The following description uses another embodiment of the invention to illustrate the color filters with inverse growing sequence and the applications thereof.

Figure 5:
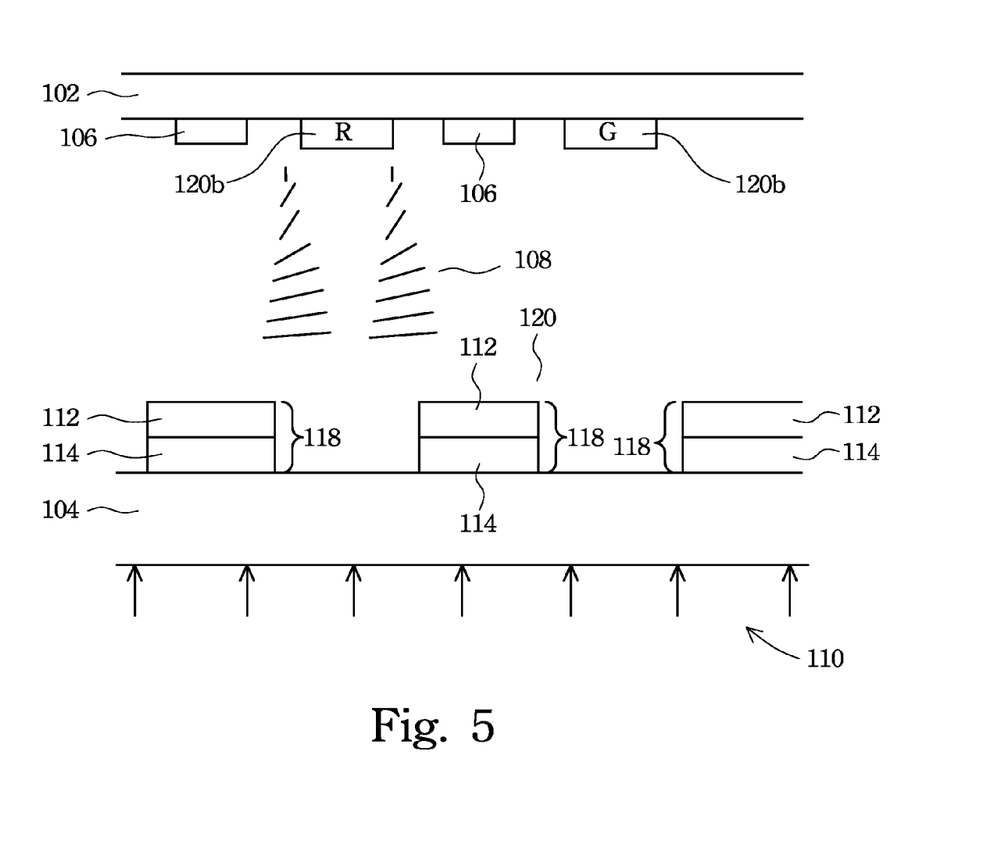
FIG. 5 is a schematic view of a reflective liquid crystal display panel structure.

FIG. 5 is a schematic view of a reflective liquid crystal display panel structure. A thin film transistor 106 is located on a thin film transistor substrate 102, and the thin film transistor 106 is in charge of changing voltage to control an alignment direction of liquid crystals 108. Black matrixes 118 are located under the thin film transistor 106, and formed on a substrate 104. Color filters 120b are located on the thin film transistor substrate 102. Light from a light source 100 passes through the substrate 104 and reaches the color filters 120b. The color filters 120b reflect and filter the light into red, green and blue light in different regions, and then emit them through the substrate 104.

Figure 6:
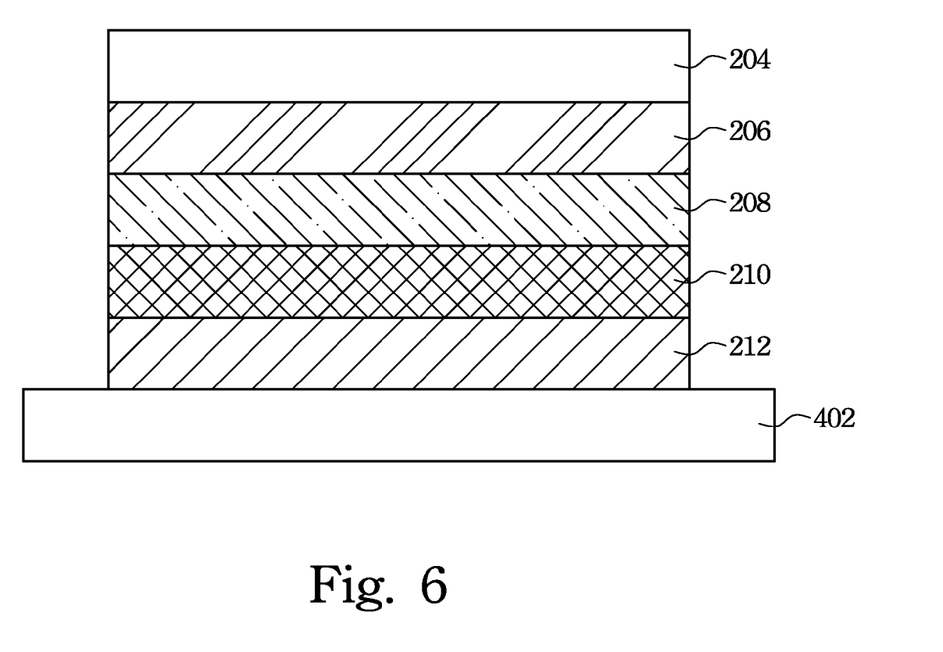
FIG. 6 is a cross-sectional view according to another preferred embodiment of this invention.

FIG. 6 is a cross-sectional view of one preferred embodiment used in a reflective liquid crystal display of the invention. A metal layer 212 is first formed on a substrate 402 by a physical vapor deposition (PVD) process. Then chemical vapor deposition processes are conducted to grow sequentially an n-type silicon layer 210, an amorphous silicon layer 208 and a silicon nitride layer 206. Finally, an indium tin oxide layer 204 is grown by a physical vapor deposition process, thus completing the structure of a reflective color filter.

Adjusting the thicknesses of the foregoing layers and the process conditions thereof can provide color filters of different colors and different brightnesses. Many different process parameters for color filters of the same color are possible, and the invention is not limited to one single specific set. Furthermore, the indium tin oxide layer 204 can be excluded to produce high-brightness reflective color filters.

In conclusion, the inventions has several advantages as follows:

1. The structure of black matrix of the invention provides good light-shading and low reflectivity, and the reflectivity thereof is less than 5% in the long wavelength region (between 650 nm and 790 nm), thus rectifying the problems of the conventional black matrix, which is highly reflective in the long wavelength region and suffers from poor reflectivity.

2. The silicon nitride layer, amorphous silicon layer and n-type silicon layer of the invention all are grown by chemical vapor deposition processes, but the conventional black matrix made of metal/oxide is formed by physical vapor deposition processes. If light interference is to be generated in films, uniformities and thicknesses of the films are critical. Chemical vapor deposition is better than physical vapor deposition for forming films on patterned surfaces. The invention therefore provides a better film quality and light interference effect than the conventional techniques.

3. The materials utilized in the invention, such as the silicon nitride layer, amorphous silicon layer and n-type silicon layer, are all existent and easily prepared in LCD manufacturing processes. Moreover, these layers can be successively formed in one chemical vapor deposition chamber, and do not require additional processes or time. In addition, black matrixes, red, green and blue color filters can be obtained just by adjusting the thicknesses and process conditions of layers, so the invention provides a simple and cheap structure of color filters.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A structure of a color filter for use in a liquid crystal display, the color filter structure comprising:
    a substrate;
    an indium tin oxide layer on the substrate;
    a silicon nitride layer on the indium tin oxide layer, wherein a value of an RF power used for growing the silicon nitride layer is a first power value;
    an amorphous silicon layer located on the silicon nitride layer;
    an n-type silicon layer located on the amorphous silicon layer; and
    a metal layer on the n-type silicon layer, wherein a light is emitted into the color filter from the substrate, and after sequentially passing through the substrate, the indium tin oxide layer, the silicon nitride layer, the amorphous silicon layer, and the n-type silicon layer, the light is reflected by the metal layer to be transmitted along an original path for leaving the color filter, wherein the light is absorbed and interfered with by the indium tin oxide layer, the silicon nitride layer, the amorphous silicon layer and the n-type silicon layer, the light being filtered into a specific color light after being emitted from the color filter.

2. The structure of claim 1, wherein a material of the substrate is glass.

3. The structure of claim 1, wherein a material of the metal layer comprises chromium.

4. The structure of claim 3, wherein when the color filter is a black matrix, a thickness of the indium tin oxide layer is about 420 Å, a thickness of the silicon nitride layer is about 500 Å, first power value is about 1.6 KW, a thickness of the amorphous silicon layer is about 500 Å, a thickness of the n-type silicon layer is about 500 Å, and a thickness of the metal layer is about 780 Å.

5. The structure of claim 3, wherein when the color filter is a reflective blue color filter, a thickness of the indium tin oxide layer is about 420 Å, a thickness of the silicon nitride layer is about 500 Å, the first power value is about 2.1 KW, a thickness of the amorphous silicon layer is about 500 Å, a thickness of the n-type silicon layer is about 500 Å, and a thickness of the metal layer is about 780 Å.

6. The structure of claim 3, wherein when the color filter is a reflective green color filter, a thickness of the indium tin oxide layer is about 168 Å, a thickness of the silicon nitride layer is about 300 Å, of the first power value is about 1.6 KW, a thickness of the amorphous silicon layer is about 500 Å, a thickness of the n-type silicon layer is about 500 Å, and a thickness of the metal layer is about 780 Å.

7. The structure of claim 3, wherein when the color filter is a reflective red color filter, a thickness of the indium tin oxide layer is about 420 Å, a thickness of the silicon nitride layer is about 400 Å, a thickness ot the first power value is about 2.1 KW, a thickness of the amorphous silicon layer is about 400 Å, a thickness of the n-type silicon layer is about 400 Å, and a thickness of the metal layer is about 780 Å.

8. The structure of claim 3, wherein when the color filter is a reflective red color filter, a thickness of the indium tin oxide layer is about 168 Å, a thickness of the silicon nitride layer is about 400 Å, a thickness ot the first power value is about 1.6 KW, a thickness of the amorphous silicon layer is about 400 Å, a thickness of the n-type silicon layer is about 400 Å, and a thickness of the metal layer is about 780 Å.

* * * * *